June 24, 1958  T. A. McMULLIN  2,840,783
RADAR SYSTEMS
Filed Sept. 28, 1953
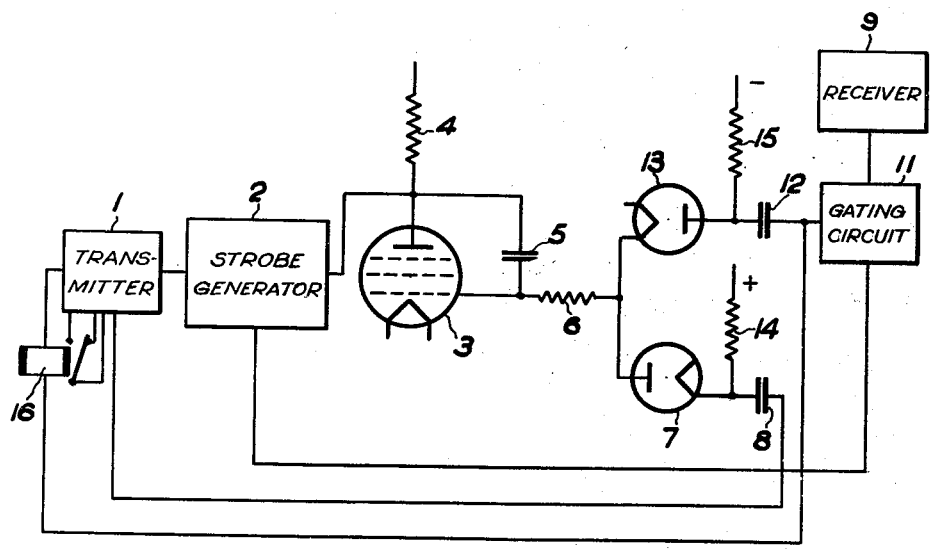
INVENTOR
Terence Alexander McMullin
BY
ATTORNEY

United States Patent Office 2,840,783
Patented June 24, 1958

2,840,783
RADAR SYSTEMS

Terence Alexander McMullin, Welwyn Garden City, England, assignor to Murphy Radio Limited, London, England, a British company Application September 28, 1953, Serial No. 382,665

4 Claims. (Cl. 343—7.3)

This invention relates to interrogator-respondor radar beacon system, and its purpose is to increase the number of aircraft a beacon can serve.

In such systems the distance of an air-borne or other moving radar set from a beacon is ascertained by measuring the time interval between radiation of an interrogation pulse and reception of a response pulse. Interrogation is repeated; and the measurement is made by the aid of a strobe pulse which is generated after each interrogation pulse, the time interval between the two being made to vary from repetition to repetition until the strobe pulse comes into coincidence with the response pulse, when the one is made to gate the other and the gated pulses are used to set back the drifting strobe pulse so that it continues in coincidence with the response pulses. Range presentation can then be either on a cathode ray tube or upon a voltmeter dial.

Many varieties of such systems are known and will be found described in radar text books, for example in "Electronic Time Measurement" and other volumes of the M. I. T. Radiation Laboratory Series. They differ in the nature of the strobe pulse, which may be double or single, in the strobe drift controller, or time modulator, which automatically causes the strobe pulse in successive repetitions to shift its time relation to the transmitted pulse, so as to sweep over a period corresponding to the difference between prescribed maximum and minimum ranges, and in the locking circuits which modify the strobe drift once the strobe pulse is brought into coincidence with the response pulse, so as to maintain the coincidence. A common scheme is to govern the interval between transmitted pulse and strobe pulse by a voltage which is caused to follow a sawtooth wave form, such as the voltage of a condenser suffering nearly linear variation of charge; for example a phantastron circuit to which are applied pulses simultaneous with the transmitted pulses may be combined with a Miller integrator limiting the range of variation of the phantastron anode voltage.

In the present invention the transmitted pulse is used not only to initiate the action of the strobe generator but also to determine the strobe drift. To that end a pulse derived from the transmitted pulse is used to charge or discharge step by step a condenser the voltage of which determines the interval between transmitted pulse and strobe pulse. Thus the sweep of the strobe pulse when searching for a response pulse is made to occur by fixed increments the frequency of which is the repetition frequency of the radar set; and so the rate of drift is directly dependent on the repetition frequency. For example the grid end of the capacitor of a Miller integrator governing a phantastron strobe-generator circuit, instead of being returned through a resistance to earth, may be connected to the interrogation pulse generator to receive from it a pulse which modifies the capacitor charge and changes by a step the governing voltage applied to the phantastron.

The strobe pulse so caused to drift at a rate dependent on the repetition frequency may be slowed down, or arrested, or its movement reversed to lock it to a response pulse into coincidence with which it has drifted, by pulses of opposite sign derived from the response pulses and applied to the capacitor of a Miller integrator or other timing circuit.

This method of controlling the strobe pulses makes it possible greatly to reduce the demand made upon a beacon by an aircraft, and so enables the beacon to respond adequately to a much increased number of aircraft. This may be understood from the following considerations.

Interrogation pulses are radiated from an aircraft at a pre-determined repetition rate. The beacon response occupies a certain short time and a further interval elapses before the beacon is ready to respond to another interrogation pulse. These factors determine the maximum number of aircraft to which the beacon could respond even if the independent interrogating pulses were evenly spaced. In fact their spacing will approach random spacing; moreover the interrogating pulses from any one air-craft are preferably not evenly spaced, but the intervals between them are randomly distributed about a mean value. So long before the number of aircraft reaches the maximum for evenly spaced interrogations the beacon will fail to respond to a certain proportion of interrogations.

A consequence of this is that in any aircraft working with a busy beacon the mean rate at which responses are received will be somewhat less than the mean rate of interrogation.

The rate of strobe drift during searching is necessarily high compared with the rate of change of range of the aircraft from the beacon, and so considerable negative acceleration of the strobe pulse is necessary to lock it to the response pulse. This involves the expenditure of a substantial amount of energy mainly in varying the charge of capacitors.

For this reason, and particularly where the range ascertained by the interrogator-respondor system is to be shown upon a dial, for instance of a voltmeter, a certain minimum mean rate of reception of response pulses is necessary to bring about locking of the strobe pulse, and if the beacon is too busy to respond to a sufficient proportion of interrogations to maintain this rate, locking of the strobe pulse will not occur.

But once the strobe pulse is locked to the response pulse, the shifts it must suffer to keep in coincidence with the response pulse, correspond with the rate of change of range, which cannot exceed the speed of the aircraft. So the strobe pulse will be kept locked to the response pulse even though the rate of reception of response pulses falls far below that necessary to bring about locking.

By use of this fact it is possible to reduce the demand made by an aircraft upon the time of a beacon once its receiver has locked itself to the beacon signal. This may be done by employing the response pulse to reduce the mean repetition frequency of the interrogation pulses. For example an auxiliary strobe pulse of great width may gate the whole of the response pulse into a control circuit which operates to reduce the search rate of interrogation.

The amount of reduction possible is limited by the rate of drift between responses. For when a strobe pulse is locked to the beacon response the voltage which governs its time relation to the interrogating pulse does not remain absolutely constant; it varies between response pulses just as it did during searching for the beacon and must not drift so much that it cannot be restored by each response pulse to the value appropriate to the distance of the aircraft from the beacon.

But once the strobe pulse is locked to the beacon the maximum rate at which it may need to shift corresponds with the maximum speed of an aircraft. There is therefore no need for the high rate of drift necessary for searching.

Now the present invention makes the rate of drift dependent on the interrogation frequency, so that when conditions allow of the interrogation frequency being reduced the rate of drift is also reduced and no longer constitutes a fixed limit to the reduction of the interrogation frequency. The limit is now the rate of change of range which is a function of the aircraft speed and heading.

Naturally a margin of safety must be allowed, and it will not usually be worth while to suit the reduced interrogation frequency to the actual speed and heading of an aeroplane. It will be sufficient to suit it to the expected maximum speed of the aeroplane, which is the maximum rate of change of range.

An embodiment of the invention in which this can be done is illustrated in the accompanying drawing, those elements of the circuit which can be of various known forms and are not changed in nature for the purpose of the invention being shown in block form.

A pulse generator and transmitter is indicated at 1. This both transmits radio pulses to the beacon and also sends simultaneous pulses into the strobe generator 2. Suitable forms of strobe pulse generator are fully described and shown in British specification 690,480. The timing of the strobe pulse in relation to the interrogation pulse is controlled by the Miller integrator tube 3 which has resistance 4 in its anode circuit and a capacitor 5 connected between its anode and control grid. The grid end of this capacitor is not returned, as in known schemes such as those above mentioned, through resistance 6 to earth, but is connected through diode 7 and capacitance 8 to the interrogation pulse generator 1. The generator 1 supplies short negative pulses, simultaneous with the interrogation pulse, which cause the diode 7 to conduct and enable the capacitor 5 to discharge by a small amount. The voltage of the anode therefore rises by a small step and the interval between interrogation pulse and strobe pulse is correspondingly increased. Thus the rate of strobe drift depends on the repetition frequency of the set.

Response pulses are received by the receiver 9 and passed by it to a gating circuit 11 which is also supplied with pulses by the strobe generator 2. When the strobe pulse and response pulse overlap in time, a pulse issues from the gating circuit and this is used to lock the strobe pulse to the response pulse. The pulse is positive in sign and is passed by way of a capacitor 12, diode 13 and resistance 6 to the capacitor 5, and so has the effect of setting back the strobe pulse in the opposite direction to its normal drift. When the strobe pulse and response pulse fully overlap the resulting setting back pulse is designed to be more than adequate to set back the strobe pulse by the amount by which it was advanced by the pulse from the transmitter. So, even if not every interrogation pulse calls forth a response pulse, and even if the range of the aircraft is changing in the sense opposite to that corresponding to normal strobe drift, the strobe pulse can be maintained in overlapping relation with the response pulse, and the amount of overlap adjusts itself to the rate of change of range.

To ensure that the diodes 7 and 13 remain non-conducting when no pulses are applied to them the diode circuits are returned to positive and negative bias sources respectively through resistances 14 and 15.

In addition, the output of the gating circuit, or of a part of it employing an auxiliary wide strobe pulse, is employed to reduce the repetition frequency of the set. To this end the gating circuit is shown as joined to a relay 16 associated with the transmitter 1 and serving to modify its circuit so as greatly to reduce the repetition frequency.

Since the reduction in repetition frequency correspondingly reduces the drift of the strobe pulse a lower frequency of response will suffice to set back the strobe pulse to the extent necessary to keep it locked to the response pulse, than would have been required if the set-back had to balance the searching rate of drift. Hence the beacon can descend to a lower level of efficiency before the strobe pulse ceases to be locked to the response pulse, or, what is better, the reduction of repetition frequency can be made greater than would have been feasible had the rate of strobe drift remained unchanged upon locking on, so reducing further the load upon the beacon and enabling it to respond to a greater number of aircraft.

I claim:

1. In a radar set the combination of an interrogation pulse generator and transmitter, a strobe pulse generator set in action simultaneously with each transmitted pulse by the interrogation pulse generator and producing a strobe pulse after an interval determined by an applied drift control voltage, a drift controller including a capacitor producing a control voltage and connected with the strobe generator to control the strobe drift, said drift controller being connected to the pulse generator and transmitter to receive from it simultaneously with each transmitted pulse, a pulse which modifies the charge of its capacitor.

2. In a radar set the combination of an interrogation pulse generator and transmitter, a receiver, a strobe pulse generator connected with the interrogation pulse generator and set in action thereby on each transmission of an interrogation pulse to produce a strobe pulse after an interval determined by an applied control voltage, a strobe drift controller including a capacitor connected with the strobe pulse generator to apply a control voltage thereto, and connected to the interrogation pulse generator to receive therefrom pulses which change the charge of the capacitor and thereby the control voltage, and connected with the receiver to receive therefrom pulses which change the charge of the capacitor and the control voltage in the opposite sense.

3. In a radar set the combination of an interrogation pulse generator, a strobe pulse generator set in action simultaneously with each transmitted pulse by the interrogation pulse generator, means governed by the interrogation pulse generator for increasing the interval between interrogation pulse and strobe pulse upon each repetition of the interrogation pulse, a response receiver, a gating circuit connected to receive the strobe pulse and response pulse, and means controlled by gated pulses from the gating circuit for decreasing the interval between interrogation pulse and strobe pulse.

4. In a radar set the combination of an interrogation pulse generator, a strobe pulse generator set in action simultaneously with each transmitted pulse by the interrogation pulse generator, means governed by the interrogation pulse generator for increasing the interval between interrogation pulse and strobe pulse upon each repetition of the interrogation pulse, a response receiver, a gating circuit connected to receive the strobe pulse and response pulse, means controlled by gating pulses from the gating circuit for decreasing the interval between interrogation pulse and strobe pulse, and further means controlled by gated pulses from the gating circuit for reducing the frequency of the interrogation pulses.

References Cited in the file of this patent
UNITED STATES PATENTS

| | | |
|---|---|---|
| 2,491,029 | Brunn | Dec. 13, 1949 |
| 2,515,464 | Minneman | July 18, 1950 |
| 2,639,419 | Williams et al. | May 19, 1953 |
| 2,671,895 | Perkins | Mar. 9, 1954 |